(12) United States Patent
Blackburn et al.

(10) Patent No.: US 8,702,176 B2
(45) Date of Patent: Apr. 22, 2014

(54) SEAT STRUCTURE—CHAMFERED MOUNTING OF COMPENSATING FLOOR LATCHES

(75) Inventors: Andrea Blackburn, Livonia, MI (US); Frederick Wilkinson, Fowlerville, MI (US); Benjamin Tong, Farmington Hills, MI (US); Yannis Poulos, Sylvania, OH (US); Shivaprasad Ramchandra, Westland, MI (US); Frederic Winters, South Lyon, MI (US); Steven White, Farmington Hills, MI (US)

(73) Assignee: Johnson Controls Technology Company, Holland, MI (US)

( * ) Notice: Subject to any disclaimer, the term of this patent is extended or adjusted under 35 U.S.C. 154(b) by 279 days.

(21) Appl. No.: 13/256,983

(22) PCT Filed: Mar. 16, 2010

(86) PCT No.: PCT/US2010/027457
§ 371 (c)(1),
(2), (4) Date: Oct. 25, 2011

(87) PCT Pub. No.: WO2010/107776
PCT Pub. Date: Sep. 23, 2010

(65) Prior Publication Data
US 2012/0038201 A1 Feb. 16, 2012

Related U.S. Application Data

(60) Provisional application No. 61/161,981, filed on Mar. 20, 2009.

(51) Int. Cl.
*B60N 2/44* (2006.01)

(52) U.S. Cl.
USPC .................................. 297/463.1; 296/65.03

(58) Field of Classification Search
USPC .......... 297/331, 335, 463.1; 296/65.03, 65.05
See application file for complete search history.

(56) References Cited

U.S. PATENT DOCUMENTS 2,104,217 A * 1/1938 Barnes ..................... 292/356
5,634,686 A * 6/1997 Okazaki ................... 297/336
(Continued)

FOREIGN PATENT DOCUMENTS

CN 1095023 A 11/1994
DE 29912439 U1 11/2000
(Continued)

OTHER PUBLICATIONS

International Search Report and Written Opinion dated Jul. 14, 2010; for Corresponding PCT Application No. US 2010/027457 Mar. 16, 2010.

(Continued)

*Primary Examiner* — Philip Gabler
(74) *Attorney, Agent, or Firm* — The Dobrusin Law Firm, PC

(57) ABSTRACT

The present invention relates to a floor latch (200) for connecting a vehicle seat base portion (204) with a vehicle floor portion, the floor latch (200) comprising an attachment means (301) and a riser (300), the floor latch (200) providing centering of the attachment means (301) for clamping the riser (300) with the seat base portion (204) or with the vehicle floor portion.

14 Claims, 5 Drawing Sheets

(56) References Cited

U.S. PATENT DOCUMENTS

| | | | |
|---|---|---|---|
| 6,698,837 B2 * | 3/2004 | Pejathaya et al. | 297/378.12 |
| 6,974,173 B2 * | 12/2005 | Yokoyama et al. | 296/65.03 |
| 7,198,316 B2 * | 4/2007 | Lutzka et al. | 296/65.03 |
| 7,243,974 B2 * | 7/2007 | Kondo et al. | 296/65.03 |
| 2006/0082204 A1 | 4/2006 | Zhang | |
| 2009/0026790 A1 * | 1/2009 | O'Connor et al. | 296/65.03 |
| 2009/0102223 A1 * | 4/2009 | Kuroki et al. | 296/65.09 |

FOREIGN PATENT DOCUMENTS

| | | | |
|---|---|---|---|
| EP | 0397333 A2 | | 11/1990 |
| JP | 60-77670 | | 5/1985 |
| JP | 10-324182 | | 12/1998 |
| JP | 2005-329803 | | 12/2005 |
| JP | 2007-270038 | * | 10/2007 |
| WO | 2010107776 A1 | | 9/2010 |

OTHER PUBLICATIONS

Corresponding PCT Application No. US 2010/027457 filed Mar. 16, 2010; Published as WO 2010/107776 A1 on Sep. 23, 2010.
First Office Action from the State Intellectual Property Office of the People's Republic of China dated Mar. 1, 2013.
Japanese Office Action dated May 7, 2013; Appln. No. 2012-500883.
Second Chinese Office Action dated Oct. 12, 2013; Appln. No. 20108166187.

* cited by examiner

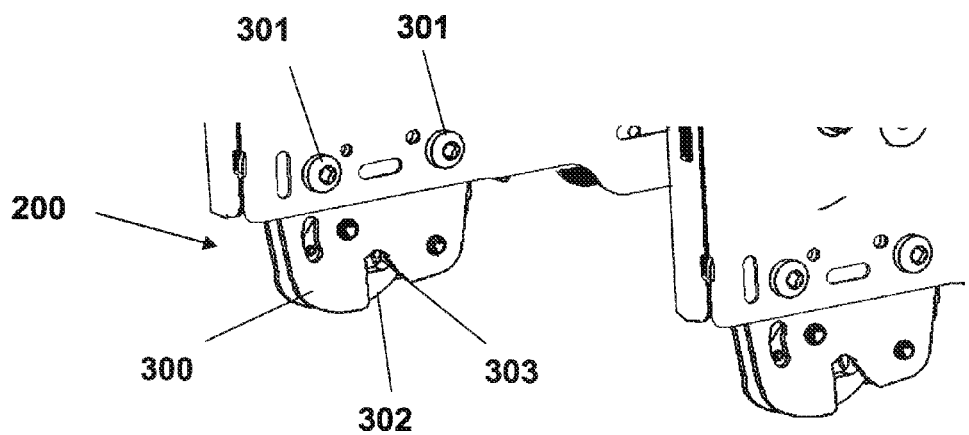
Fig. 3
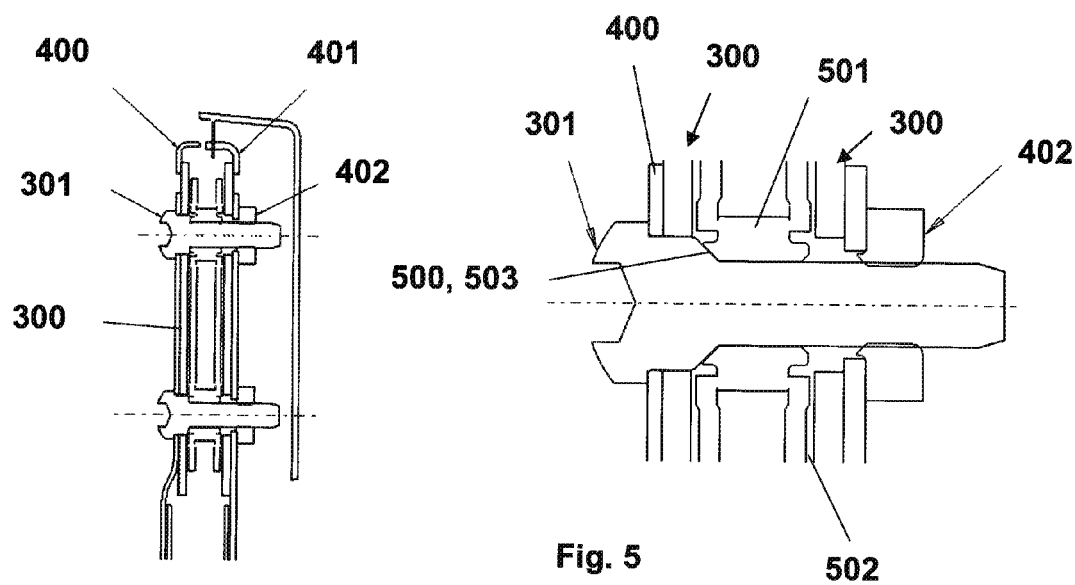
Fig. 4
Fig. 5

SEAT STRUCTURE—CHAMFERED MOUNTING OF COMPENSATING FLOOR LATCHES

CLAIM OF PRIORITY

This application claims priority from provisional application Ser. No. 61/161,981 filed 20 Mar. 2009, and is a national application based on PCT Application International Application PCT/US2010/027457, filed 16 Mar. 2010 (published as WO2010/107776) and claims the benefit of the filing date of 16 Mar. 2010, all incorporated herein by reference.

BACKGROUND

The present invention relates generally to the field of vehicle seating. More specifically, this invention relates to a floor latch for use in vehicle seat components especially vehicle seat structures.

Current vehicle seats comprise a seat base being mounted to the floor of the vehicle by means of floor latches. These current vehicle seat structures require an important effort related to the assembly process of the seat structure as well as the drawbacks during operation of the seat structure especially with respect to the attachment of the floor latches to the seat base structure.

There remains a continuing need to improve the time required to manufacture a vehicle seat component, to reduce the cost of the vehicle seat component, to enhance the flexibility in the assembly process, and to improve the performance of the vehicle seat component.

SUMMARY

The present invention overcomes the disadvantages of the prior art by providing a floor latch for connecting a vehicle seat base portion with a vehicle floor portion, the floor latch comprising an attachment means and a riser, the floor latch providing centering of the attachment means for clamping the riser with the seat base portion or with the vehicle floor portion.

According to the present invention it is advantageously possible to provide a better centering of the attachment means and/or a better clamping of at least one riser located within the floor latch.

The attachment means preferably comprises a bolt, preferably a chamfered bolt. Preferably the floor latch can be assembled easily by means of a chamfered bolt such that both a fast and efficient assembly is possible and an improved operation of the floor latch can be achieved.

The floor latch preferably comprises a floating bushing. The floating bushing preferably interacts with the attachment means preferably by means of a chamfered surface of the floating bushing.

According to a preferred embodiment of the present invention, the attachment means comprises at least two chamfered bolts.

Preferably the floor latch, more preferably a catch part of the floor latch, interacts with a striker pin at the vehicle seat base portion and/or at the vehicle floor portion.

Preferably the floating bushing comprises an opening interacting with the attachment means. It is furthermore preferred to realize the floor latch such that the floating bushing comprises two openings. Preferably the two openings and interact with the attachment means. Preferably the two openings interact with the attachment means by means of further chamfered surfaces.

Preferably the attachment means is attached to the floor latch by a fixing means, preferably by a weld nut. Preferably the attachment means is threaded to the fixing means.

Preferably the riser comprises an oversized hole, wherein the floating bushing is positionable in the oversized hole in different positions relative to the oversized hole. It is thereby advantageously possible to allow the floor latch to be in its proper location or position prior to final mounting. Therefore it is advantageously possible to compensate manufacturing tolerances of the striker pin, the floating bushing and the riser so that the manufacturing of the striker pin, the floating bushing and the riser can be much easier and therefore the producing costs can be significantly lowered.

Another object of the present invention is a vehicle seat with a seat base portion, wherein the seat base portion is connected to a vehicle floor portion by a floor latch according to the present invention.

FIG. 3 is a perspective view of two floor latches according to an exemplary embodiment.

FIG. 4 is a sectional representation of the floor latch according to a first embodiment, the line of intersection being the centerline of a fastening bolt.

FIG. 5 is a sectional enlarged view of the floor latch according to the embodiment of FIG. 4.

DETAILED DESCRIPTION

Figure 1:
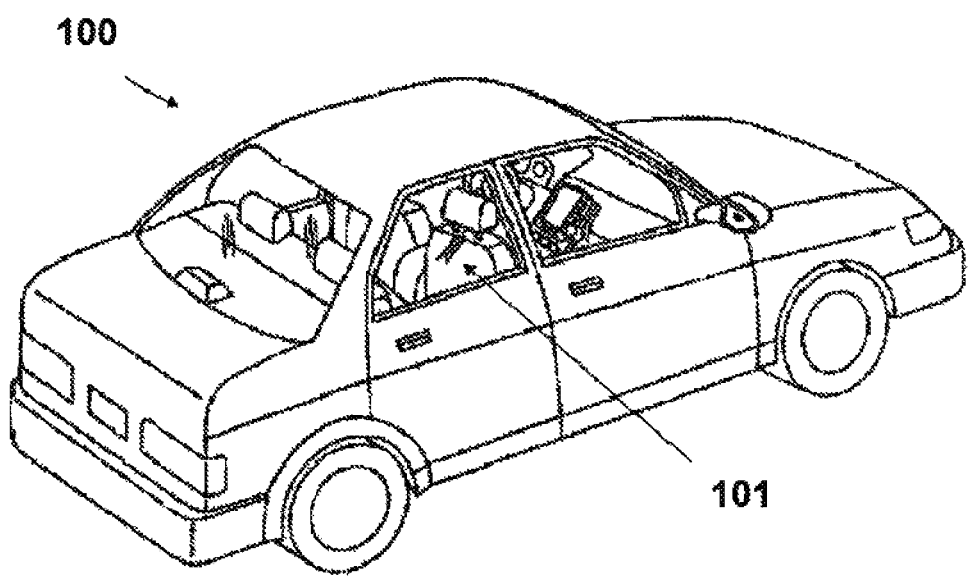
FIG. 1 is a perspective view of a vehicle having seats including a floor latch according to an exemplary embodiment.
Figure 2:
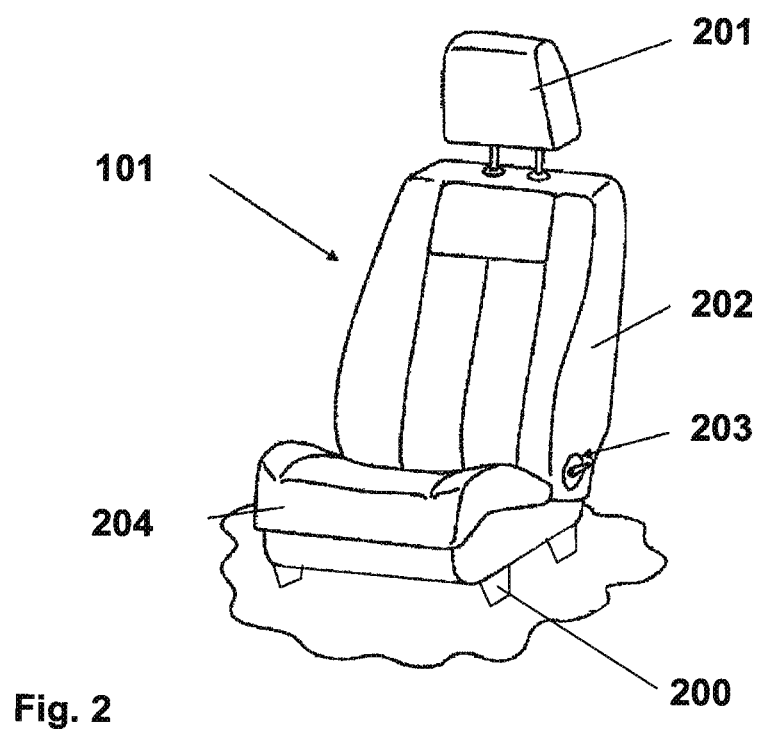
FIG. 2 is a perspective view of a vehicle seat including a floor latch according to an exemplary embodiment.

Referring generally to the figures and in particular to FIG. 1, a vehicle 100 is shown according to an exemplary embodiment. The vehicle 100 includes one or more vehicle seats 101 provided for an occupant of the vehicle. One exemplary embodiment of a vehicle seat structure is shown in FIG. 2. While the vehicle shown is a 4-door sedan, it should be understood that the seat may be used in a mini-van, sport utility vehicle or any other means in or by which someone travels or something is carried or conveyed for any market or application including everything from office seating and transportation to air planes and space travel and everything in between. The vehicle seat shown includes a seat back 202, a seat base 204, and a connection member or recliner 203 coupled to the seat back 202 and the seat base 204. The vehicle seat 101 further may include a head restraint 201 and base portion 204. The headrest 201 extends upward form the seat back 202 and is configured to restrain the head of an occupant. The base portion 204 (e.g. track assembly) couples the seat 101 to the vehicle body or to a vehicle floor portion and may be configured to allow the seat 101 to be selectively positioned (manually or electrically driven) relative to the vehicle body or the vehicle floor portion.

The seat 101 comprises at least one floor latch 200 but preferably, it comprises a plurality of floor latches 200, especially two floor latches 200 either on its front left and front right side or on its rear left and rear right side of the seat 101.

According to another embodiment of the present invention, the seat 101 comprises two floor latches 200 at the front left and rear left side or at the front right and rear right side of the seat 101. According to another embodiment of the present invention, the seat 101 comprises more than two floor latches 200, e.g. three or four floor latches 200.

In FIG. 3, two floor latches 200 are shown in a perspective view of the floor latches 200 according to an exemplary embodiment. In the following description, one of the two floor latches 200 represented in FIG. 3 is explained according to a first exemplary embodiment and according to a second exemplary embodiment. The floor latch 200 is or the plurality of floor latches 200 is preferably attached to the base part 204 of the vehicle seat 101. A striker pin 303 or a plurality of striker pins 303 is preferably attached to the floor portion of the vehicle. Preferably, each floor latch 200 is provided such that it is able to interact with one striker pin 303 such that a strong attachment between the vehicle seat 101 and the vehicle body (with the floor portion) is possible in case that a catch portion 302 or catch part 302 of the floor latch 200 is in a closed position. In case the floor latch 200 (or the catch portion 302 thereof) is in an open position or in a position such that it can be opened, the attachment of the vehicle seat 101 and the vehicle body can be released, e.g. for moving the vehicle seat 101 or a part thereof in a position such that an easy entry of a passenger to the vehicle is possible or such that the vehicle seat 101 can be stowed away in order to increase the transport capacity of the vehicle. According to an alternative embodiment, it is also possible that the floor latch 100 is or the plurality of floor latches 200 is attached to the floor portion of the vehicle. In this alternative embodiment, a striker pin 303 or a plurality of striker pins is attached to the base part 204 of the vehicle seat. In the following, only the embodiment of the floor latch 200 being fixed to the vehicle seat 101 is explained.

The floor latch 200 as represented in FIG. 4 to FIG. 8 according to both the first and the second embodiment comprises a housing 300 or a housing plate, preferably two housing plates. In the context of the present invention the housing plate or housing plates is/are also called a riser 300 or a riser plate or a plurality of riser or riser plates. Furthermore the floor latch 200 comprises a mechanics portion for the latch functionality. The mechanics portion is protected within the housing 300 or between the risers or riser plates. The mechanics portion especially comprises a catch part 302 interacting with a striker pin 303 fixed to the floor of the vehicle. A bolt 301 or a plurality of bolts 301 is provided to attach the floor latch 200 to the vehicle seat base part 204. According to the present invention, the floor latch 200 comprises a floating bushing 501. The floating bushing 501 is located between the risers 300 or riser plates. Preferably, the floating bushing 501 is provided with an opening such that the bolt 301 is pushed through the opening of the bushing 501 when the floor latch 200 is mounted to the base part 204 of the vehicle seat. In a preferred embodiment of the present invention, the floating bushing 501 comprises two openings interacting with two bolts 301 for attaching the floor latch 200 to the base part 204 of the vehicle seat. Preferably, the floating bushing 501 is provided as a single piece having two openings. The riser 300 can be provided such that it comprises a riser plate and a riser bracket 400 or such that it comprises a riser plate and a reinforcement riser bracket 401. Preferably, the bolt 301 is attached to the floor latch 200 by means of a weld nut 402 or another fixing means 402. By means of threading the bolt 301 to the weld nut 402, any gap 502 existing between the floating bushing 501 and one riser 300 or riser plate or between the floating bushing 501 and both risers 300 or riser plates can be eliminated. Furthermore, it is possible to improve the centering (during the assembly of the floor latch 200) of the bolt 301 or bolts relative to the floating bushing 501 and/or relative to the risers 300 or riser plates.

According to a first embodiment of the floor latch 200 shown in FIG. 4 and FIG. 5, the bolt 301 comprises a first chamfered surface 500 and the floating bushing 501 comprises a second chamfered surface 503. The chamfered surfaces 500, 503 interact together for an improved clamping of any gap 502 between the floating bushing 501 and one riser 300 or riser plate or between the floating bushing and both risers or riser plates. Furthermore, by means of the chamfered surfaces 500, 503, it is possible to greatly improve the assembly of the floor latch 200 according to the first embodiment of the present invention.

Figure 6:
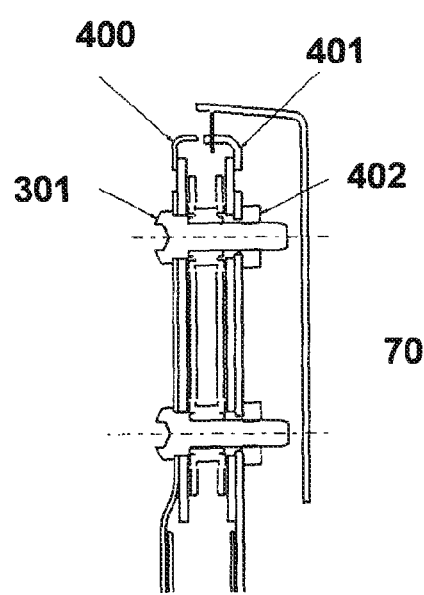
FIG. 6 is a sectional representation of the floor latch according to a second embodiment, the line of intersection being the centerline of the fastening bolt.
Figure 7:
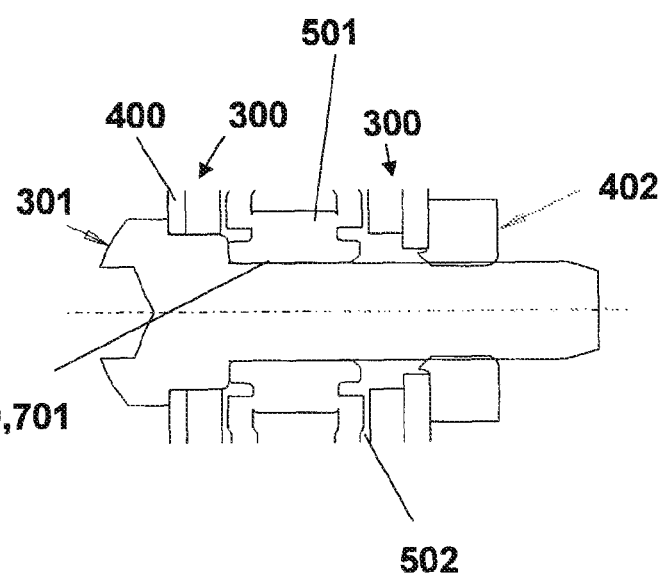
FIG. 7 is a sectional enlarged view of the floor latch according to the embodiment of FIG. 6.

According to a second embodiment of the floor latch 200 shown in FIG. 6 and FIG. 7, the bolt 301 comprises a first radial surface 700 and the floating bushing comprises a second radial surface 701. The radial surfaces 700, 701 interact together for an improved clamping of any gap 502 between the floating bushing 501 and one riser 300 or riser plate or between the floating bushing and both risers or riser plates.

Figure 8:
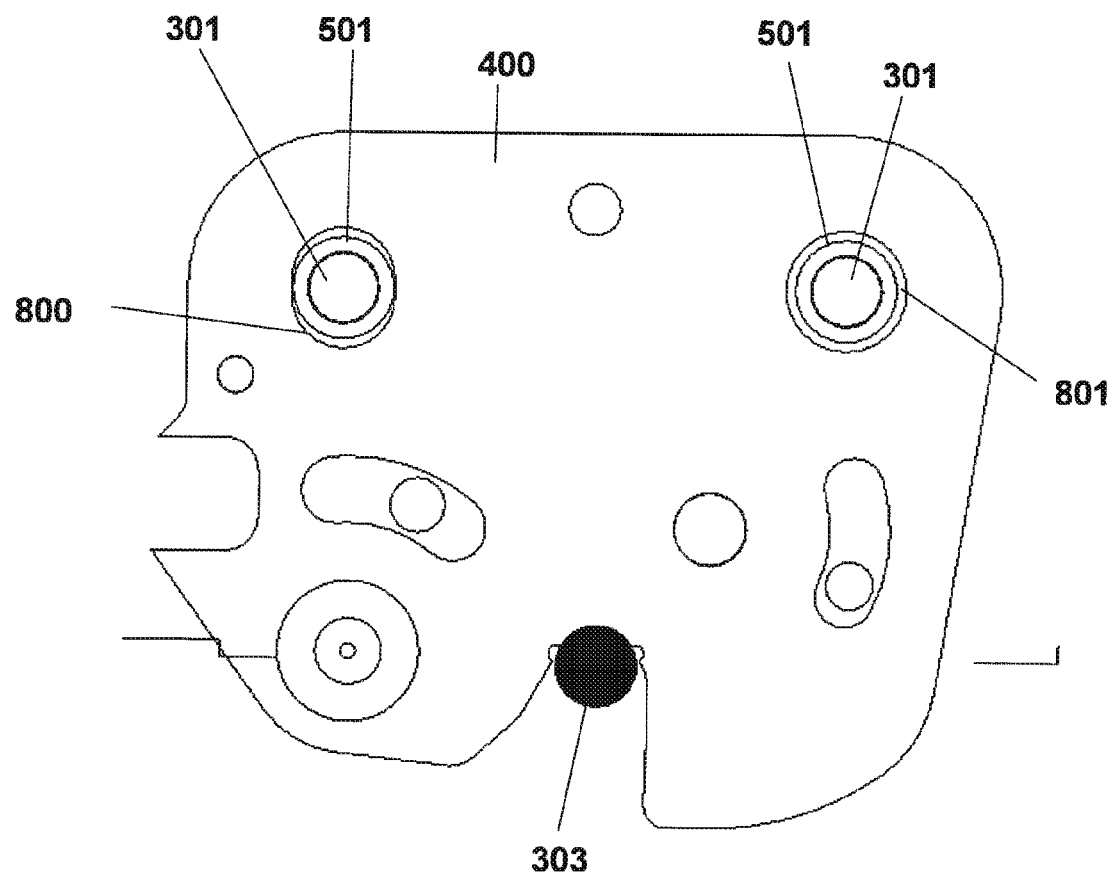
FIG. 8 is a sectional representation of the floor latch according to an exemplary embodiment, the line of intersection travelling perpendicular to the centerline of the fastening bolt.

In FIG. 8, for both fastening bolts 301 attaching the floor latch 200 to the seat base 204, oversized holes 800, 801 in the riser 300 or riser plates are shown. The oversized holes 800, 801 are provided such that the floating bushing 501 is able to be positioned in different relative positions with respect to the riser bracket 400 or risers. The oversized hole 800 in the riser or riser plate represented on the left hand side of FIG. 8 allows different relative positions in a vertical direction. The oversized hole 801 in the riser or riser plate represented on the right hand side of FIG. 8 allows different relative positions in both a vertical and a horizontal direction. It is thereby advantageously possible to allow the latch 200 to be in its proper location prior to final mounting. Especially in the case of the first embodiment according FIG. 4 and FIG. 5 provided with chamfered surfaces 500, 503 on both the bolt and the floating bushing, the chamfered shoulder of the bolt will keep the floor latch in its position.

| List of references | |
|---|---|
| 100 | vehicle |
| 101 | vehicle seat assembly |
| 200 | floor latch |
| 201 | head rest |
| 202 | seat back |
| 203 | recliner mechanism |
| 204 | seat base, seat base portion |
| 300 | housing plate, riser |
| 301 | attachment means, bolt |
| 302 | catch part |
| 303 | striker pin |
| 400 | riser bracket |
| 401 | reinforcement bracket |
| 402 | weld nut |
| 500, 503 | chamfered surfaces |
| 501 | floating bushing |
| 502 | gap to be clamped |
| 700, 701 | radial surfaces |
| 800, 801 | oversized holes |

The invention claimed is:

1. A floor latch for connecting a vehicle seat base portion with a vehicle floor portion, the floor latch comprising an attachment means and a riser, the floor latch providing centering of the attachment means for clamping the riser with the seat base portion or with the vehicle floor portion, wherein the attachment means comprises a chamfered bolt, the floor latch comprises a floating bushing and the riser comprises an oversized hole, wherein the floating bushing is positionable in the oversized hole in different positions relative to the oversized hole.

2. The floor latch according to claim 1, wherein the floating bushing interacts with the attachment means.

3. The floor latch according to claim 1, wherein the attachment means comprises at least two chamfered bolts.

4. The floor latch according to claim 1, wherein the floor latch, interacts with a striker pin at one or both of the vehicle seat base portion and at the vehicle floor portion.

5. The floor latch according to claim 1, wherein the floating bushing comprises an opening interacting with the attachment means.

6. The floor latch according to claim 1, wherein the attachment means is attached to the floor latch by a fixing means.

7. The floor latch according to claim 6, wherein the attachment means is threaded to the fixing means.

8. The floor latch according to claim 1, wherein a chamfered surface of the floating bushing interacts with the attachment means.

9. The floor latch according to claim 1, wherein the floor latch comprises a catch part and the catch part of the floor latch interacts with one or both of a striker pin at the vehicle seat base portion and at the vehicle floor portion.

10. The floor latch according to claim 1, wherein the attachment means is attached to the floor latch by a fixing means comprising a weld nut.

11. A vehicle seat with a seat base portion, wherein the seat base portion is connected to a vehicle floor portion by a floor latch according to claim 1.

12. The vehicle seat according to claim 11, wherein the attachment means of the floor latch comprises at least two chamfered bolts.

13. The vehicle seat according to claim 11, wherein the floor latch interacts with a striker pin at one or both of the vehicle seat base portion and the vehicle floor portion.

14. The vehicle seat according to claim 11, wherein the floating bushing comprises an opening interacting with the attachment means.

* * * * *